L. D. COULTER.
KAFIR CORN HEADER.
APPLICATION FILED MAR. 24, 1916.
1,280,671.
Patented Oct. 8, 1918.
6 SHEETS—SHEET 1.
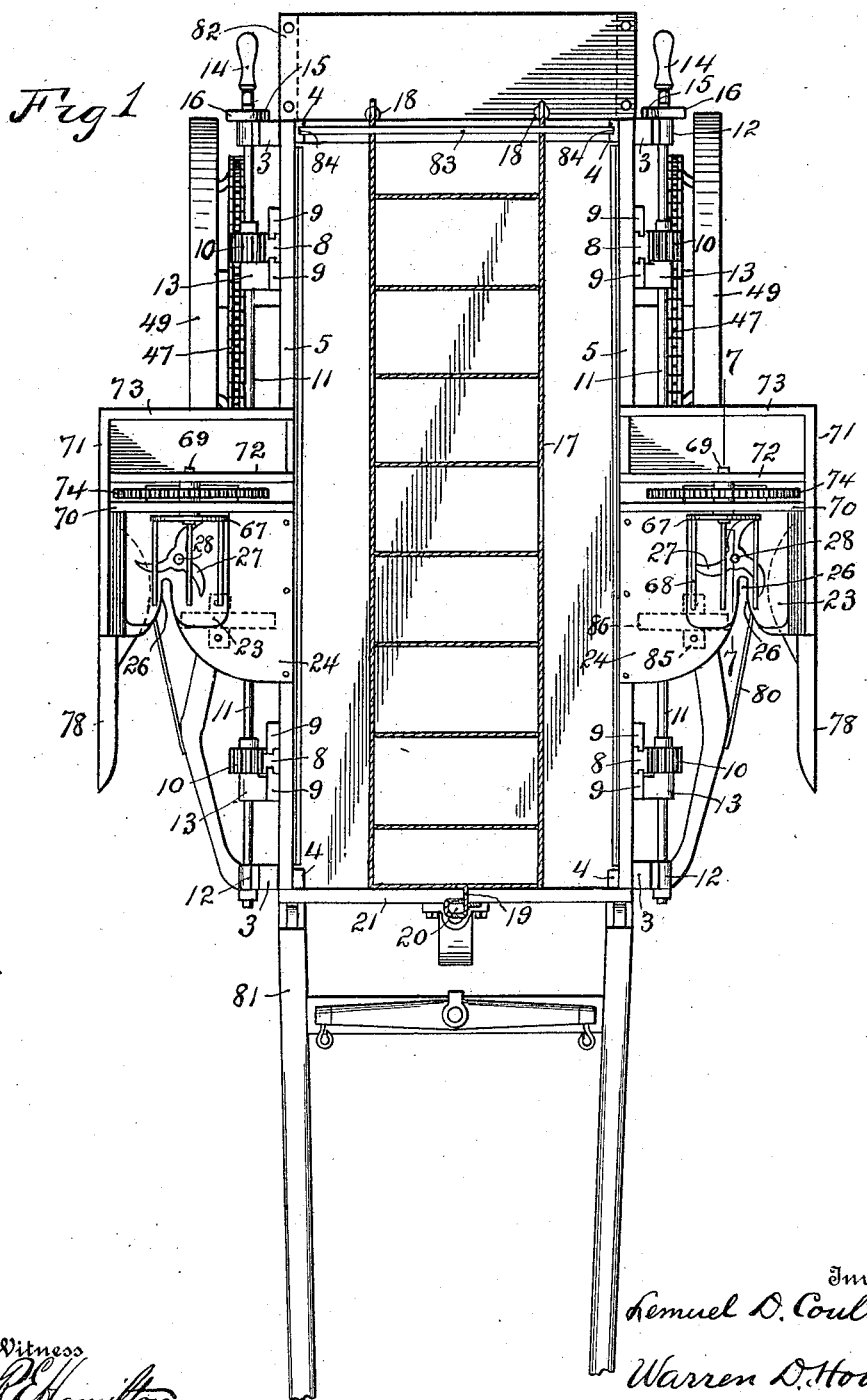
Witness
R. E. Hamilton
Inventor
Lemuel D. Coulter
Warren D. House
By
His Attorney

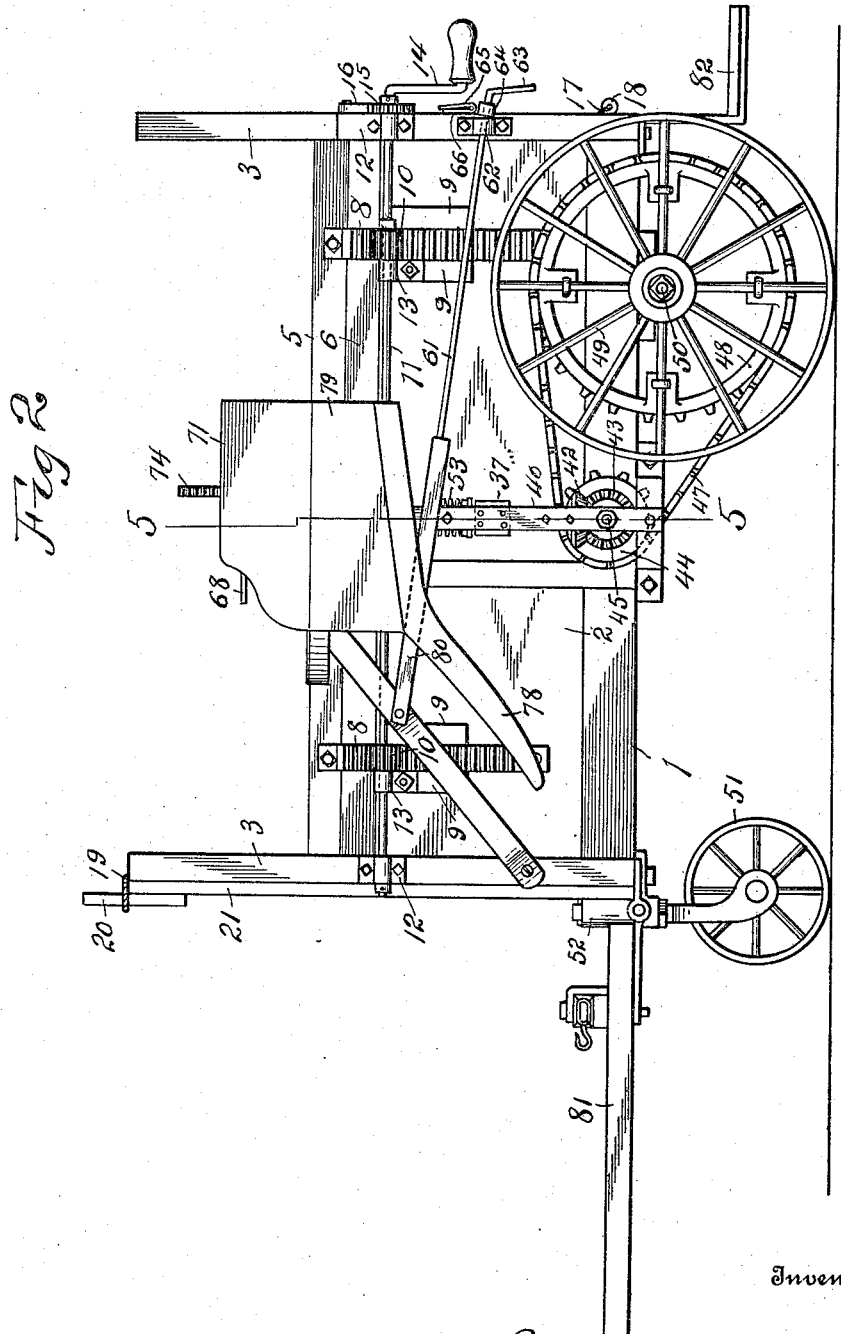

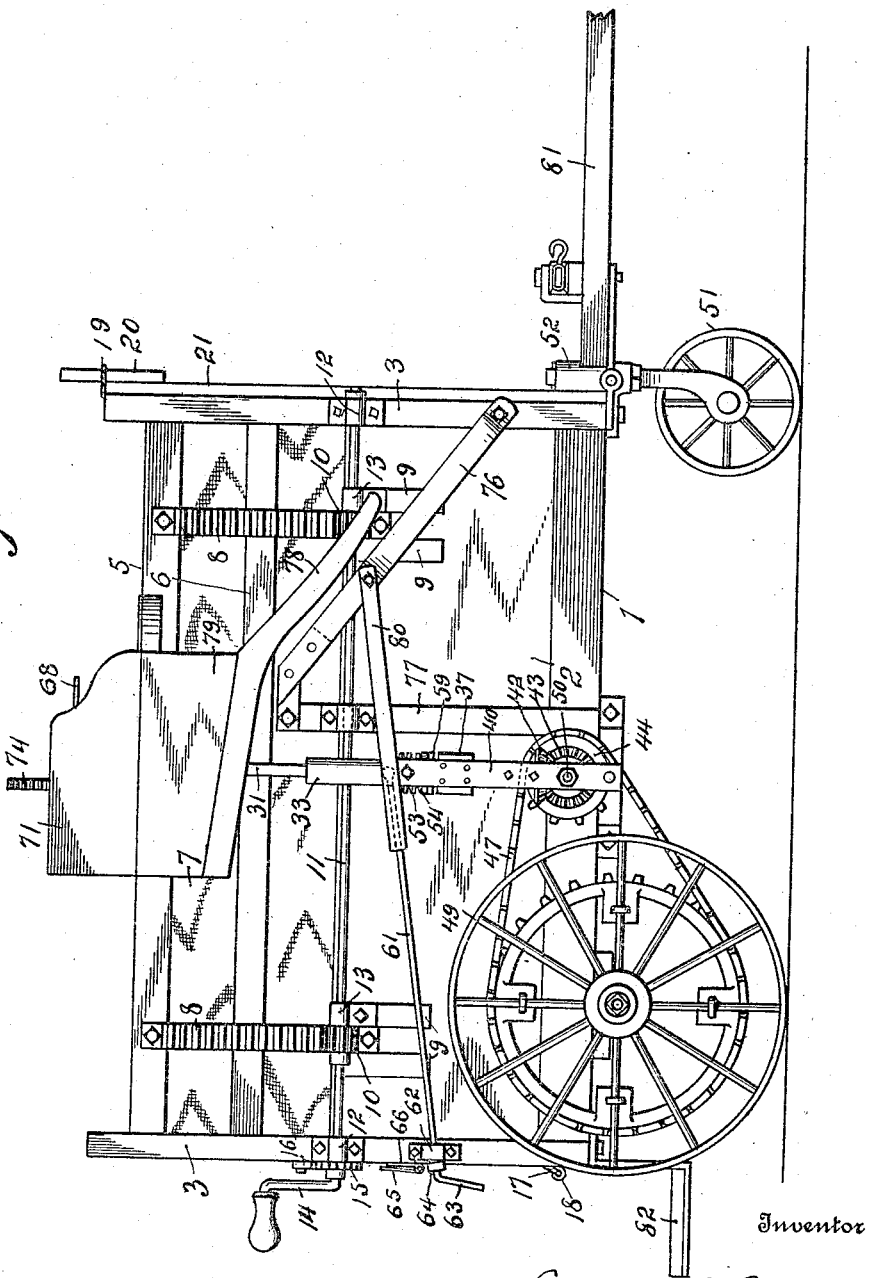

L. D. COULTER.
KAFIR CORN HEADER.
APPLICATION FILED MAR. 24, 1916.
1,280,671.
Patented Oct. 8, 1918.
6 SHEETS—SHEET 4.
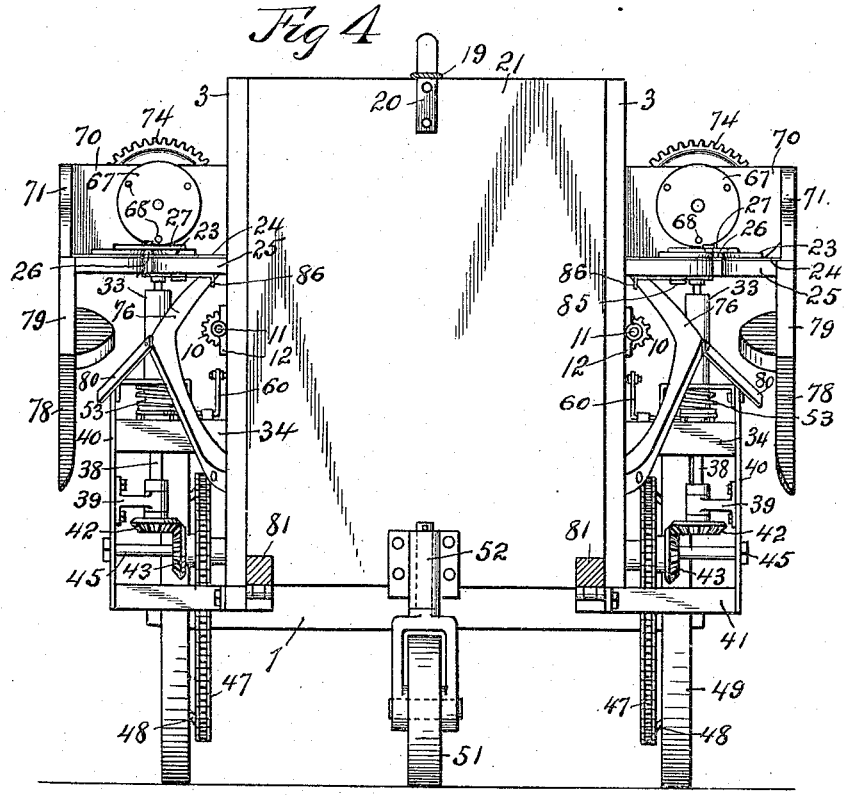
Witness
R.E.Hamilton
Inventor
Lemuel D. Coulter
Warren D. House
By
His Attorney L. D. COULTER.
KAFIR CORN HEADER.
APPLICATION FILED MAR. 24, 1916.
1,280,671.
Patented Oct. 8, 1918.
6 SHEETS—SHEET 5.
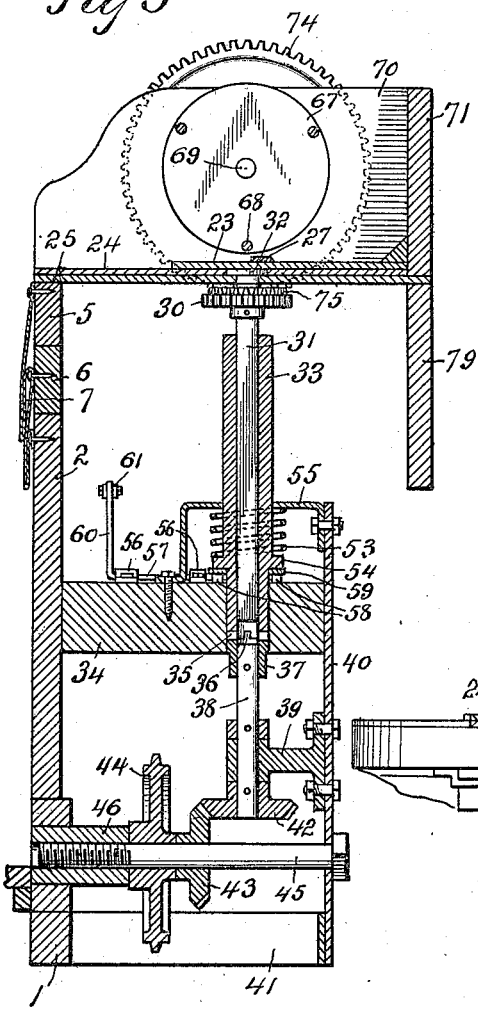
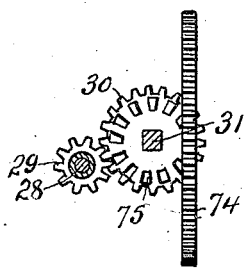
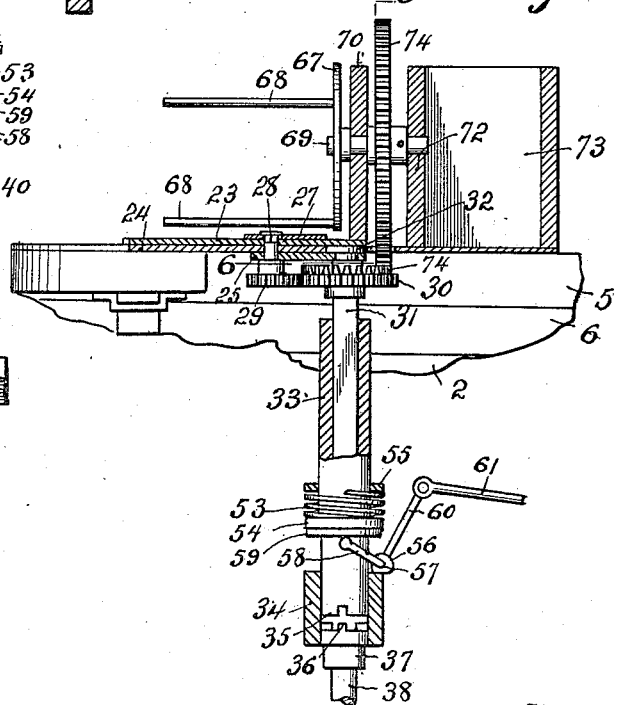
Witness
R. E. Hamilton
Inventor
Lemuel D. Coulter
Warren L. House
By His Attorney L. D. COULTER.
KAFIR CORN HEADER.
APPLICATION FILED MAR. 24, 1916.
1,280,671.
Patented Oct. 8, 1918.
6 SHEETS—SHEET 6.
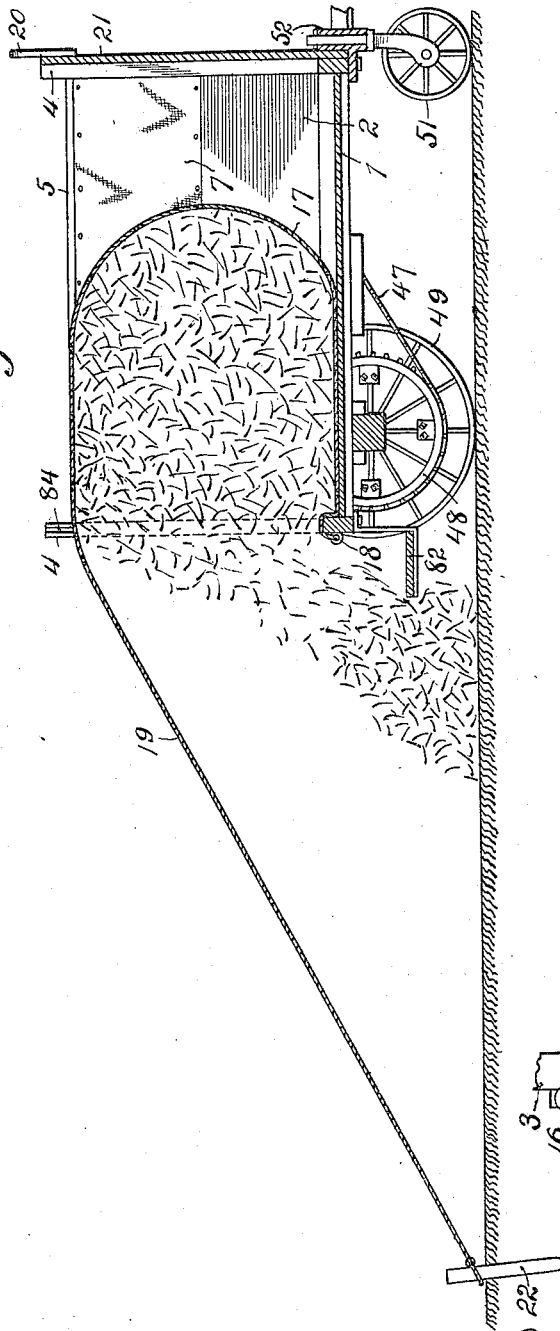
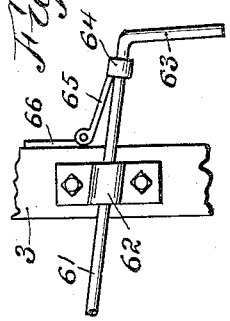
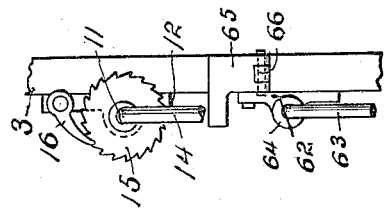
Inventor
Lemuel D. Coulter
Warren D. House
His Attorney
Witness
R. Hamilton
By

UNITED STATES PATENT OFFICE.

LEMUEL D. COULTER, OF BURLINGTON, KANSAS, ASSIGNOR OF ONE-HALF TO ADELMA J. SANDERS, OF HALLS SUMMIT, KANSAS.

KAFIR-CORN HEADER.

1,280,671.        Specification of Letters Patent.        Patented Oct. 8, 1918.

Application filed March 24, 1916. Serial No. 86,405.

*To all whom it may concern:*

Be it known that I, LEMUEL D. COULTER, a citizen of the United States, residing at Burlington, in the county of Coffey and State of Kansas, have invented a certain new and useful Improvement in Kafir-Corn Headers, of which the following is a specification.

My invention relates to improvements in Kafir corn headers.

One of the objects of my invention is to provide a machine having head cutting means at each side thereof, whereby two rows of corn may be cut at a time, if desired, or the machine may be driven alternately in opposite directions, so as to consecutively cut the rows at one side of a field.

Another object of my invention, is to provide a machine which may be readily adjusted to cut stalks of different height.

Still another object of my invention is to provide novel means for operating the cutting mechanisms independently of each other.

An object of my invention is to provide a vertically extensible or adjustable wagon bed of novel construction.

Another object of my invention is to provide means by which the cutting mechanisms may be manually controlled from the rear end of the bed.

Another novel feature of my invention comprises mechanism by which the load may be easily and quickly dumped.

Other novel features of my invention are hereinafter fully described and claimed.

In the accompanying drawings, which illustrate the preferred embodiment of my invention, Figure 1 is a top view of my improved machine, partly broken away.

Fig. 2 is an elevation of the left side of the machine.

Fig. 3 is an elevation of the right side of the machine.

Fig. 4 is a front elevation of the machine, the shafts being broken off.

Fig. 5 is an enlarged vertical sectional view on the line 5—5 of Fig. 2.

Fig. 6 is a sectional view on the line 6—6 of Fig. 7.

Fig. 7 is an enlarged vertical sectional view on the line 7—7 of Fig. 1.

Fig. 8 is a vertical sectional view of the wagon bed and the sling, the latter being shown in the dumping position, and parts being removed and broken away.

Fig. 9 is an enlarged rear elevation showing some of the mechanism for controlling one of the head cutters and part of the mechanism for vertically adjusting one of the side members of the bed, parts being broken away.

Fig. 10 is an enlarged side elevation of the slide bar, and some of the parts connected therewith, which controls the operation of one of the cutters, parts being broken away.

Similar reference characters designate similar parts in the different views.

1 designates a receptacle for the cut heads of corn, the receptacle comprising, preferably, a wagon bed having vertically extensible sides. As both sides of the bed are alike, a description of one will suffice for both. Each side of the bed is provided with a stationary lower member 2 to the outer side of which are respectively secured, at the forward and rear ends of the bed respectively, two vertical posts 3, Fig. 1. Secured to the inner side of the member 2, opposite respectively to the posts 3, are two vertical posts 4, Figs. 1 and 8. Vertically slidably adjustable between the posts 3 and 4 is a side member 5 and an intermediate side member 6.

Secured to the side members 2, 5 and 6 is a flexible closure comprising, preferably, a strip of canvas 7, which when the members 5 and 6 are raised, as shown in Fig. 3, closes the spaces between the member 6 and the members 2 and 5. When the side members 5 and 6 are lowered, as in Figs. 2 and 5, the closure 7 folds on the inside of the bed.

For vertically adjusting the side members 5 and 6, the side member 5 may have secured to its outer side the upper ends of two vertical racks 8, each of which is slidably mounted between two vertical guide blocks 9, which are secured to the outer side of the member 2, Figs. 2 and 3. The racks 8 respectively mesh with two pinions 10 secured to a horizontal shaft 11, which is disposed longitudinally at the outer side of the bed, and which is rotatably mounted in bearings 12 secured respectively to the posts 3, and in bearings 13 respectively secured to two of the blocks 9.

The rear end of the shaft 11 is provided with a crank 14, which the operator turns in raising and lowering the members 5 and 6.

To hold the shaft 11 from being rotated by the weight of the members 5 and 6, when raised, said shaft has secured to it a ratchet wheel 15 in which is adapted to engage a gravity actuated pawl 16 which is pivoted to the adjacent bearing 12 above the ratchet wheel, Fig. 9.

For quickly and easily dumping a load, the following described mechanism may be employed. A sling 17, preferably of flexible material, such as ropes formed into ladder shape, is secured at its rear end to two eye bolts 18, which are secured to the rear end of the bed 1 adjacent to the lower side thereof, Figs. 1 and 8. A rope or cable 19 is secured at one end to the free end of the sling 17 and is adapted to be fastened releasably to a post 20 secured centrally to the dash board 21 of the bed, Figs. 1 and 4.

The sling 17 is adapted to lie on the bottom of the wagon bed 1, as shown in Fig. 1, with its forward portion disposed vertically at the rear of the dash board 21. When so disposed, heads of corn deposited in the bed or receptacle will lie above the sling.

When it is desired to dump the load, the cable 19 is released from the post 20, and fastened to an anchoring device, such as a stake 22, Fig. 8, which is driven in the ground at the rear of the machine. By then drawing the machine forwardly, the sling 17 will be drawn rearwardly out of the wagon bed, thus depositing the cut heads of corn upon the ground.

The machine at each side of the bed 1 is provided with head cutting mechanism and mechanism for operating the same. As the cutting means and driving mechanism therefor on one side of the bed are the same as that on the other side of the bed, a description of one of these mechanisms will suffice.

Referring particularly to Figs. 1 to 7, 23 designates a horizontal steel shear plate, which is secured to the upper side of a horizontal plate 24 which in turn is mounted upon a horizontal plate 25, Figs. 5 and 7, the latter being secured to and vertically adjustable with the side member 5. The forward edge of the shear plate 23 is provided with a V-shaped notch 26, which is adapted to receive therein the stalks to be cut, and over which are adapted to pass the arms of a horizontal star-shaped cutter 27 which bears against and coöperates with the shear plate 23, and which is rigidly secured to the upper end of a short vertical shaft 28, Fig. 7, which is rotatably mounted in the plate 25 and which extends through said plate and has secured to its lower end a pinion 29, which meshes with a horizontal spur gear wheel 30, secured to the upper end of a vertical shaft 31, Figs. 6 and 7, having a cylindrical portion rotatably mounted in the plate 25 and provided with a peripheral flange 32, Fig. 7, adapted to rest upon the upper side of said plate for supporting said shaft.

For rotating the shaft 31, there is provided a vertical longitudinally movable sleeve 33 provided with a longitudinal square hole, in which is slidably fitted the shaft 31, the lower portion of which is square in cross section, so that rotation of the sleeve will cause rotation of the shaft. The sleeve 33 is cylindrical and at its lower end is slidably and rotatably mounted in a bar 34, Fig. 5, which is secured to and extends horizontally from the outer side of the adjacent side member 2.

The lower end of the sleeve 33 is provided with dental clutch teeth 35 adapted, when in the lowermost position shown in Fig. 5, to engage with similar dental clutch teeth 36, which are provided on the upper end of a clutch member 37, which is rigidly secured to a short vertical shaft 38, which is rotatably mounted in a bearing 39 secured to the inner side of a vertical plate 40, which is secured to the bar 34 and to a U-shaped bar 41 which is secured to and extends horizontally from the bottom portion of the bed 1.

Secured to the lower end of the shaft 38 is a bevel gear wheel 42 which meshes with a bevel gear wheel 43, which in turn is rigidly secured to a sprocket wheel 44, Figs. 2 and 5, which with the gear wheel 43 is rotatably mounted on a horizontal bolt 45, which at its outer end is mounted in the plate 40 and which at its inner end is rigidly secured in a threaded sleeve 46, Fig. 5, which in turn is rigidly secured to the bed 1.

The sprocket wheel 44 is connected by a sprocket chain 47 with a sprocket wheel 48, which is concentrically secured, in the usual manner, to the inner side of the adjacent rear carrying wheel 49, which is rotatably mounted on the rear axle 50, which supports the rear end of the bed 1. The forward end of the bed 1 is supported upon a carrying wheel 51 swiveled in a bearing 52 which is secured to the forward end of the bed 1.

For normally automatically forcing the upper clutch member comprising the sleeve 33 downward into locked engagement with the clutch member 37, a coil spring 53, Figs. 5 and 7, encircles the sleeve 33 and has its lower end bearing upon a peripheral flange 54 on the sleeve 33, and its upper end bearing against the under side of a U-shaped brace 55, which has its arms secured respectively to the plate 40 and to the upper side of the bar 34.

In order that the clutch member or sleeve 33 may be lifted against the pressure of the spring 53, out of engagement with the clutch member 37, there is mounted in bearings 56 secured to the upper side of the bar 34, a horizontal shaft 57, provided at one end with two arms 58 which are adapted to bear against the under side of a collar 59, Figs. 5 and 7, which loosely encircles the sleeve 33 and is adapted to support the same by engagement with the under side of the peripheral flange 54.

The other end of the shaft 57 is provided with a crank arm 60, to which is pivoted the forward end of a rearwardly and downwardly extending rod 61, Figs. 2, 5 and 7, the rear end of which is slidably mounted in a bearing 62, secured to the outer side of the adjacent post 3, Fig. 10.

The rear end of the rod 61 is provided with a downwardly extending handle 63, by which the rod 61 may be manually slid rearwardly when it is desired to swing the lever 57 so as to lift the sleeve clutch member 33 out of engagement with the clutch member 37. For holding the rod 61 in the retracted position, it has secured to it intermediate of the handle 63 and the bearing 62, a collar 64, Figs. 9 and 10, adapted to have its forward end engaged by a locking plate 65, which is hinged to a plate 66 secured to the adjacent post 3. When the rod 61 has been drawn rearwardly to the position shown in Fig. 10, the plate 65 may be dropped thereupon so as to engage the forward end of the collar 64. When so engaged, the clutch members 33 and 37 will be held out of engagement with each other.

For the purpose of striking the heads of corn cut off from their stalks by the rotary cutter 27, there is provided a vertical disk 67, Figs. 4, 5 and 7, which has secured to it one or more forwardly extending horizontal arms 68, which when the disk 67 is rotated, pass consecutively closely adjacent to the cutter 27 and strike the cut heads of corn and discharge them into the wagon bed.

For rotating the disk 67 in the proper direction, it is rigidly secured to a short horizontal longitudinally extending shaft 69, Fig. 7, which is rotatably mounted adjacent to its forward end, in a vertical transverse plate 70, which is secured to the upper side of the plate 24, and to the inner side of a vertical longitudinally disposed plate 71 which is mounted on the plate 25, and which extends forwardly and rearwardly of the plate 70. The other end of the shaft 69 is rotatably mounted in a transverse vertical plate 72, which is supported by the plate 24 and which forms the forward side of a tool box 73, Figs. 1 and 7, the outer side of which is formed by the plate 71. By having the axis of the disk 67 longitudinally and horizontally disposed, the arms 68 can readily toss the cut heads laterally into the receptacle and without liability of choking.

Secured to the shaft 69, is a spur gear wheel 74, which meshes with a circular row of crown teeth 75, with which the upper side of the gear wheel 30 is provided, Figs. 5, 6 and 7.

When the shaft 31 is rotated, the disk 67 will also be rotated through the intermediacy of the gear wheels 30 and 74 and the shaft 69.

The forward edges of the plates 24 and 25 are provided each with a slot which registers with the slot 26 of the shear plate 23, so as to permit the stalks of corn to pass into the path of movement of the cutter 27.

For the purpose of guiding the stalks of corn into the slot or notch 26, there is provided an inclined guide plate 76, the lower end of which is secured to the adjacent forward post 3, Fig. 3, and the rear end of which is secured to a vertical post 77 extending upwardly from and secured to the bed 1. This guide plate 76 is disposed at one side of the slot or notch 26, and at the other side is provided a forwardly and downwardly extending guiding plate 78 which is secured to a vertical plate 79, which in turn is secured to the under side of the plate 25 adjacent to the outer edge thereof.

To keep the stalks from which the heads have been cut from clogging the gearing on that side of the machine, a downwardly and rearwardly inclined guide plate 80 has its forward end secured to and supported by the guide plate 76.

For the purpose of drawing the machine about, it has secured to its forward end a pair of shafts 81.

Secured to the rear end of the bed 1 is a transverse platform 82, upon which the operator may stand when operating the machine.

In the operation of the machine, the cranks 14 are turned so as to vertically adjust, in the manner already described, the vertically movable side members of the bed and the cutting members 27 and 23. The adjustment is such that the stalks of corn will be cut at the proper place below the heads, and this, of course, will depend upon the height of the corn in the particular field which is being cut. The operator then releases the locking plates 65 from the collars 64, thereby permitting the coil springs 53 to force the clutch members 33 into engagement respectively with the adjacent clutch members 37. When only one side of the machine is to be used in cutting, it will be understood that only the locking plate 66 which is on that side of the machine will be released.

If now the machine be drawn forwardly, the rotary cutter 27 and the disk 67 which are on the side of the machine to be used for cutting, will be rotated through the intermediacy of the mechanism hereinbefore described. The operator then has the machine drawn so that the stalks of the row to be cut will enter the slot or notch 26, and the rotating cutter 27 will sever the heads from the stalks and the arms 68 will knock the several heads into the wagon bed.

If desired, as shown in Fig. 1, an end gate 83 may be slid into vertical grooves 84 which are provided on the inner sides of the rear posts 4.

When the wagon bed is to be dumped, in the manner hereinbefore described, the end gate 83 is first removed.

In order that the stalks may not enter the slots or notches 26 in the shear plates 23, when it is desired not to cut the stalks while the machine is running, each plate 25 has secured to its under side a U-shaped guide plate 85, Figs. 1 and 4, in which is transversely slidable a plate 86, which is adapted to be moved to and from a position in which it will extend across the slot or notch 26.

By having two cutting mechanisms, one at each side of the machine, spaced at a suitable distance apart, the operator may cut two rows of corn at a time. The provision of two sets of cutting mechanisms also enables the operator to cut one row with the cutting mechanism at one side of the machine and to then travel in the opposite direction and cut the next row with the cutting mechanism at the other side of the machine.

I do not limit my invention to the structure shown and described, as modifications, within the scope of the appended claims, may be made without departing from the spirit of my invention.

What I claim is:—

1. In a Kafir corn header, a wheeled receptacle for receiving the heads of corn, the receptacle comprising a bed having closed sides adjustable as to height, head cutting means carried by one of said sides and adjustable vertically therewith, means for discharging the cut heads into said receptacle, and means actuated by one of the wheels of said receptacle for operating said cutting means.

2. In a Kafir corn header, a wheeled receptacle for receiving the heads of corn, having a side comprising two members, one of which is vertically adjustable, a flexible closure connecting said two members, means for vertically moving said adjustable member, head cutting means carried by said adjustable member, means for discharging the cut heads into said receptacle, and means actuated by one of the wheels of said receptacle for operating said cutting means.

3. In a Kafir corn header, a receptacle for receiving the heads of corn comprising a bed having sides adjustable as to height, one of said sides comprising two members, one of which is vertically adjustable, a vertical rack secured to one of said members, a rotary shaft, a pinion secured to said shaft and meshing with said rack, and head cutting means carried by the vertically adjustable member.

4. In a Kafir corn header, a receptacle for receiving the heads of corn comprising a bed having sides adjustable as to height, one of said sides comprising two members, one of which is vertically adjustable, a vertical rack secured to one of said members, a rotary shaft, releasable means for holding the shaft from turning in one direction, a pinion secured to said shaft and meshing with said rack, and head cuttting means carried by the vertically adjustable member.

5. In a Kafir corn header, a wheeled receptacle for receiving the heads of corn, a rotary cutter carried by said receptacle, a rotary member having a longitudinal horizontal axis and carried by said receptacle and arranged to engage and discharge the cut heads into said receptacle, and means actuated by one of the wheels of said receptacle for rotating said cutter and rotary member.

6. In a Kafir corn header, a wheeled support having a vertically adjustable member, head cutting means carried by said member and adjustable therewith, a rotary member having a longitudinal horizontal axis and carried by said adjustable member and adapted to engage the cut heads and remove them from the cutting means, and means actuated by one of the wheels of said support for rotating said rotary member and operating said cutting means.

7. In a Kafir corn header, a support having a vertically adjustable member, cutting means carried by and adjustable with said member, a rotary member having a longitudinal horizontal axis and carried by and adjustable with said member and arranged to engage the cut heads and remove them from said cutting means, a driven shaft carried by said adjustable member and rotatable thereon and adjustable therewith, means actuated by said driven member for rotating said rotary member and operating said cutting means, a driving shaft rotatably mounted on said support, and manually controlled transmission means for engaging and disengaging the said shafts.

In testimony whereof I have signed my name to this specification.

LEMUEL D. COULTER.

Copies of this patent may be obtained for five cents each, by addressing the "Commissioner of Patents, Washington, D. C."